United States Patent
Verma et al.

(10) Patent No.: US 10,922,105 B1
(45) Date of Patent: Feb. 16, 2021

(54) REALTIME GENERATED ASSISTANCE VIDEO

(71) Applicant: International Business Machines Corporation, Armonk, NY (US)

(72) Inventors: Pramod Verma, Fairfax, VA (US); Vijender Koorella, Austin, TX (US); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/806,600

(22) Filed: Mar. 2, 2020

(51) Int. Cl.
| | |
|---|---|
| *G06F 9/451* | (2018.01) |
| *G06F 11/34* | (2006.01) |
| *G06F 9/48* | (2006.01) |
| *G06F 3/0482* | (2013.01) |
| *H04L 29/08* | (2006.01) |

(52) U.S. Cl.
CPC ............ *G06F 9/453* (2018.02); *G06F 9/4881* (2013.01); *G06F 11/3438* (2013.01); *G06F 3/0482* (2013.01); *G06F 11/3476* (2013.01); *H04L 67/22* (2013.01)

(58) Field of Classification Search
CPC .... G06F 9/453; G06F 3/0482; G06F 11/3438; G06F 11/3476; H04L 67/22
See application file for complete search history.

(56) References Cited

U.S. PATENT DOCUMENTS

| | | | |
|---|---|---|---|
| 10,026,400 B2 | 7/2018 | Gelfenbeyn et al. | |
| 10,185,917 B2 | 1/2019 | Greystoke et al. | |
| 2008/0091515 A1 | 4/2008 | Thieberger et al. | |
| 2009/0327184 A1* | 12/2009 | Nishizaki | G06F 3/0482 |
| | | | 706/46 |

(Continued)

FOREIGN PATENT DOCUMENTS

| | | |
|---|---|---|
| CN | 102368246 A | 3/2012 |
| WO | 2017213891 A1 | 12/2017 |

OTHER PUBLICATIONS

Disclosed Anonymously, "Method and System for Providing Timely and Intelligent Guidance to Assist Users using Automated Conversational Agents," An IP.com Prior Art Database Technical Disclosure, IP.com No. IPCOM000254947D, Aug. 15, 2018, 4 pages. https://ip.com/IPCOM/000254947.

(Continued)

*Primary Examiner* — Dino Kujundzic
(74) *Attorney, Agent, or Firm* — Nolan M. Lawrence

(57) ABSTRACT

A user performing a first process on a first computing device is detected. The first process includes one or more discrete tasks. A process flow graph, that is generated before performance of the first task, related to the first process is retrieved based on detection of the first process. A user action that relates to the one or more discrete tasks of the first process is identified based on the first process and based on the process flow graph. A current state of the first process is determined based on the first process and based on the process flow graph. A first video is generated based on the (Continued)

current state of the first process and based on the user action. The first video depicts one or more future actions that may be performed by the user to successfully perform the first process on the first computing device.

20 Claims, 5 Drawing Sheets

(56) References Cited

U.S. PATENT DOCUMENTS

| | | | | |
|---|---|---|---|---|
| 2011/0271185 A1* | 11/2011 | Chen | ................ | G06F 9/451 715/708 |
| 2013/0198671 A1* | 8/2013 | Kasai | ................ | G06F 9/453 715/771 |
| 2015/0095823 A1* | 4/2015 | Brewer | ............ | G06F 3/04895 715/768 |
| 2015/0120389 A1* | 4/2015 | Zhang | ................ | G06Q 30/016 705/7.32 |
| 2015/0121219 A1* | 4/2015 | Baklanovs | ............ | G06F 9/453 715/712 |
| 2015/0206063 A1* | 7/2015 | Santero | ............... | G06Q 30/016 706/12 |
| 2017/0235582 A1* | 8/2017 | Ramirez | ............ | G06F 3/0482 715/708 |
| 2018/0136949 A1* | 5/2018 | Duesterwald | ........... | G06F 9/453 |
| 2019/0026123 A1* | 1/2019 | Akuka | ............... | G06F 3/04895 |
| 2019/0089800 A1* | 3/2019 | Zhang | ................ | H04L 67/2823 |
| 2019/0286461 A1* | 9/2019 | Toksos | ............... | G06F 11/3447 |
| 2019/0324778 A1* | 10/2019 | Bhowmick | ......... | H04L 41/5074 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

REALTIME GENERATED ASSISTANCE VIDEO

BACKGROUND

The present disclosure relates to automated assistants, and more specifically, to real-time generation of assistance material.

Users may become confused or overwhelmed in some cases regarding the proper way to perform tasks or processes on a computer. Resources may be available but may be hard to locate or may be too voluminous to easily decipher. Video-based resources may be too voluminous to store or access.

SUMMARY

According to embodiments of the present disclosure, a method, system, and computer program product. A user performing a first process on a first computing device is detected. The first process includes one or more discrete tasks. A process flow graph related to the first process is retrieved based on detection of the first process. The process flow graph is generated before performance of the first task. A user action that relates to the one or more discrete tasks of the first process is identified. The user action is identified based on the first process and based on the process flow graph. A current state of the first process is determined. The determination is based on the first process and based on the process flow graph. A first video is generated based on the current state of the first process and based on the user action. The first video depicts one or more future actions that may be performed by the user to successfully perform the first process on the first computing device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
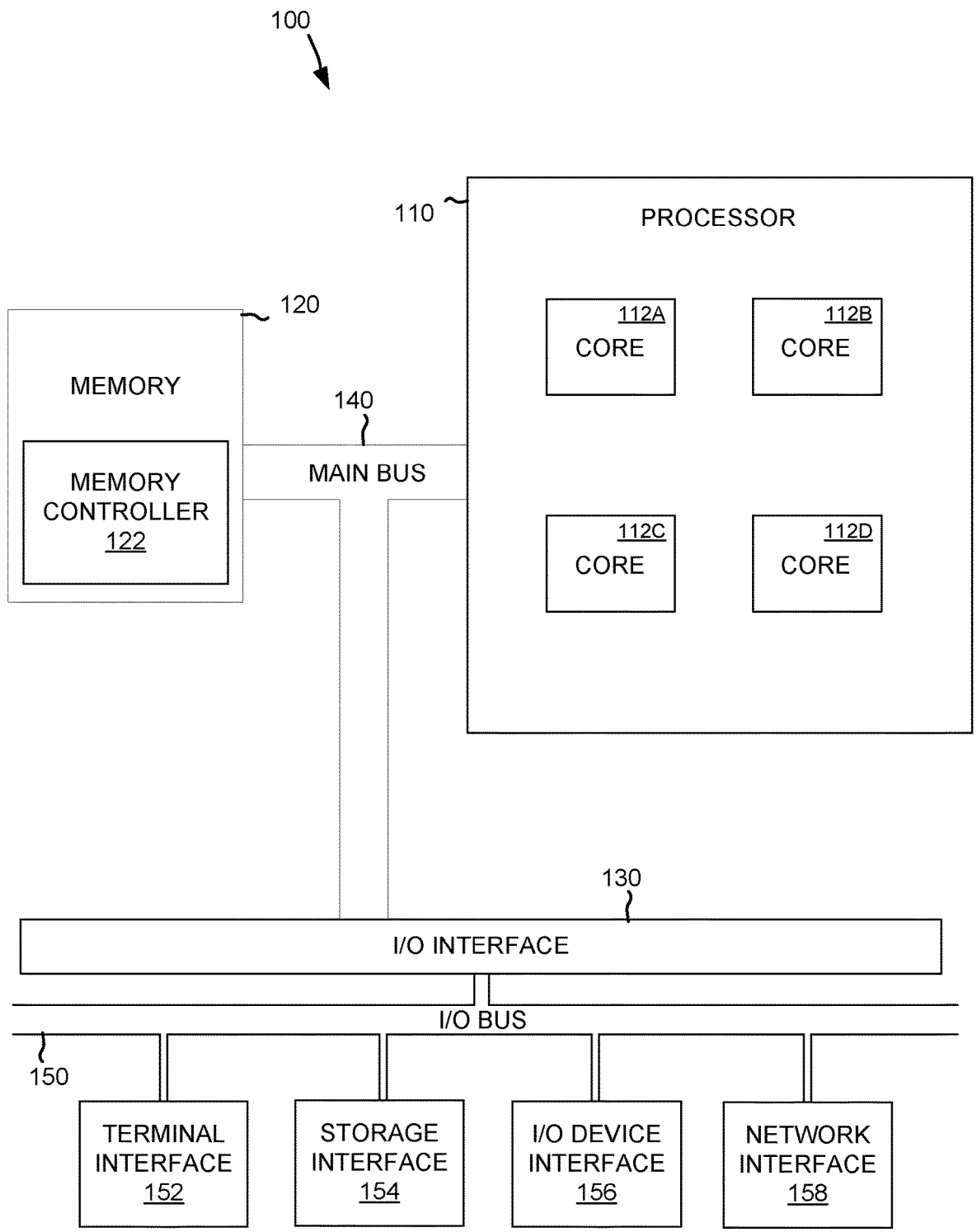
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automated assistants; more particular aspects relate to real-time generation of assistance material. While the present disclosure is not necessarily limited to such applications, various aspects of the disclosure may be appreciated through a discussion of various examples using this context.

Automated assistants are increasingly used to provide support for computing users as they may be economical and able to answer many common questions. These automated assistants may take the form of a messaging client within a window of a user-interface of the computer of the user (e.g., a chatbot). These chatbots may leverage one or more techniques to derive the intent of the user and provide links to certain documentation.

In many cases while documentation can exist, it is often in a form that is overwhelming. For example, there can be thousands of pages of documentation found online that a user of a computer might want to access but it would take too long to try and understand it all when performing a simple task.

In other situations, documentation may be non-specific or stored with other documentation, which may cause a user to spend extended periods of time searching for the proper documentation. Even when the proper document is found, many users may find it tedious to read through the documentation to identify what exactly to do when all they are trying to do is perform a straightforward process, such as installing and configuring an image editor to convert a digital image. On top of that, at times, some parts of the documentation can be outdated.

Another consideration is that many users who use computers are visual in their understanding and completing of processes on a computer. Often a user may prefer to learn by watching a video of the specific discrete tasks that make up the process (e.g., configuring toolbars, selecting text, copying variables) performed live on a video depiction of a tutorial computing environment. Unfortunately, videos can often be resource intensive. For example, a video stored on a server can have significant storage costs for a provider of the videos. In another example, the size of videos may consume the bandwidth of a user of the computer such that they are unable to access a pre-generated video. In another example, because of the large size of videos that illustrate what a user should do to perform discrete tasks of a process, many video providers may only create few, or very generalized, videos. The generalized videos have content that may be quite inapplicable to the situation that a user is facing or may not illustrate a key issue that is plaguing the user.

Another consideration is the time it takes a user to determine the process is stuck and that the user needs help. During this time, a user may become frustrated by the search for proper instructions and may decide to give up on performing the discrete tasks of the process. This leads to further confusion when using the computer, as the user may decide to come back and re-engage on the problem later. Additionally, full-length videos that illustrate a process may be several minutes or hours long and may cause a user to become frustrated scrubbing around trying to find applicable subject matter regarding the discrete tasks the user may be misunderstanding.

A dynamically generated assistance video system (DAVS) may provide advantages over existing help systems and may be a more efficient usage of computing resources. A DAVS may make sure that a user is helped at the right time when they are struggling in performing a process on a computer. For example, the DAVS may provide the right material and in a manner that is easily consumable by the user. The DAVS may operate by creating, at the time of a need for help, the visual content such that suit the context of the discrete tasks and the current state within the process of a user performing a process on the computer.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
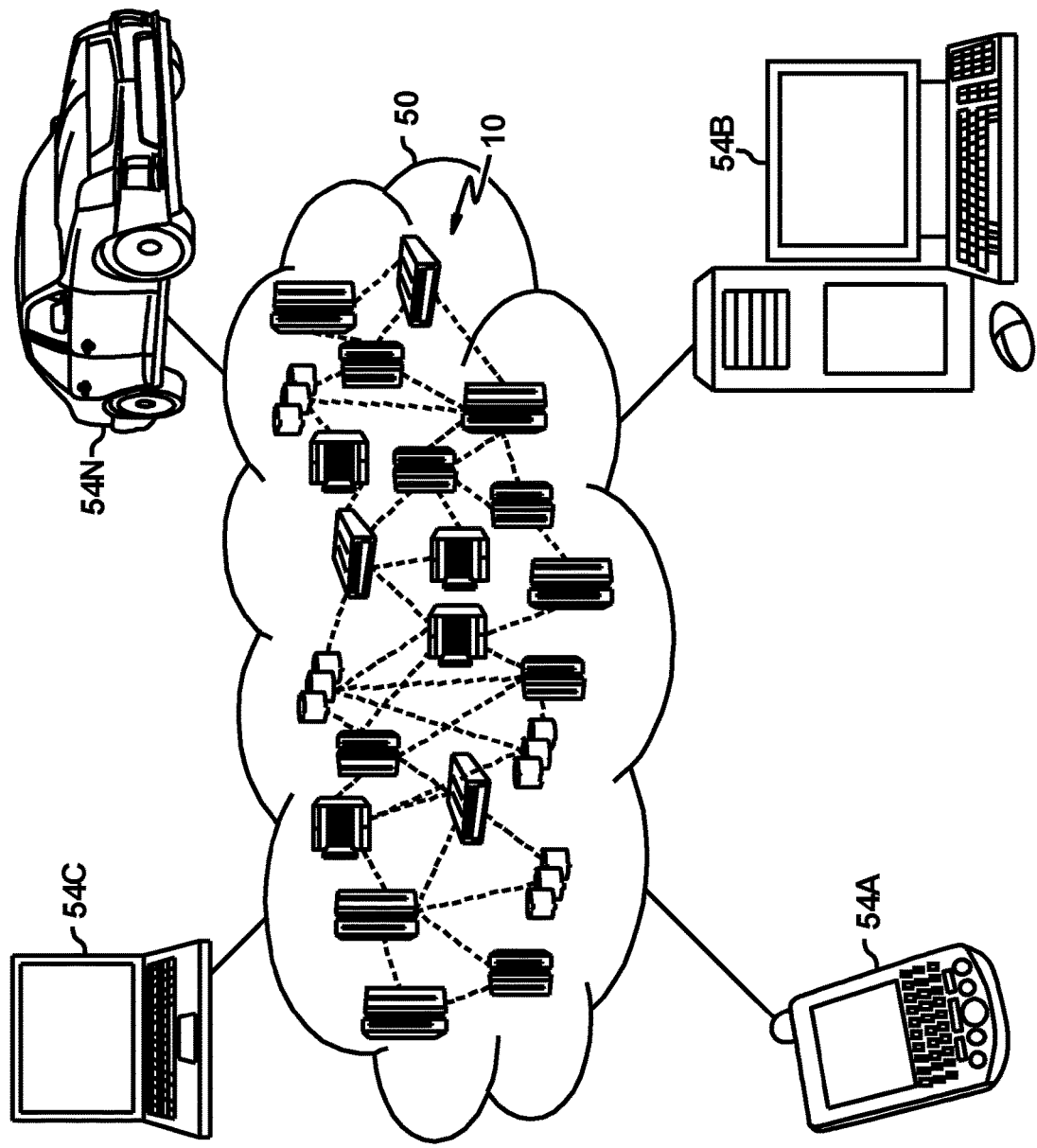
FIG. 2 illustrates a cloud computing environment.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
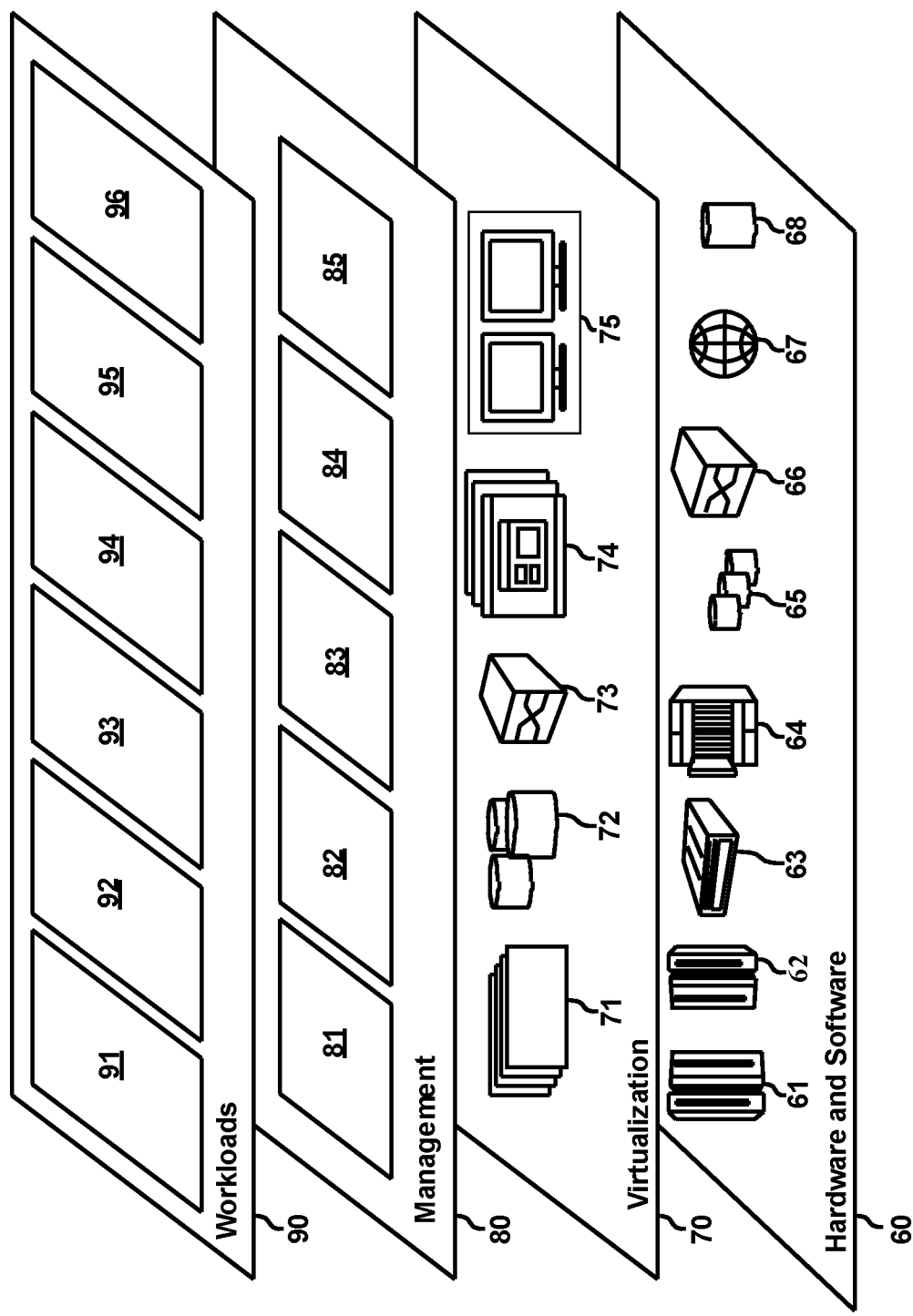
FIG. 3 depicts a set of functional abstraction layers provided by cloud computing environment.

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service level management 84 may operate in conjunction with the workloads layer 90 to perform DAVS. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content update on a virtual machine monitoring.

Figure 4A:
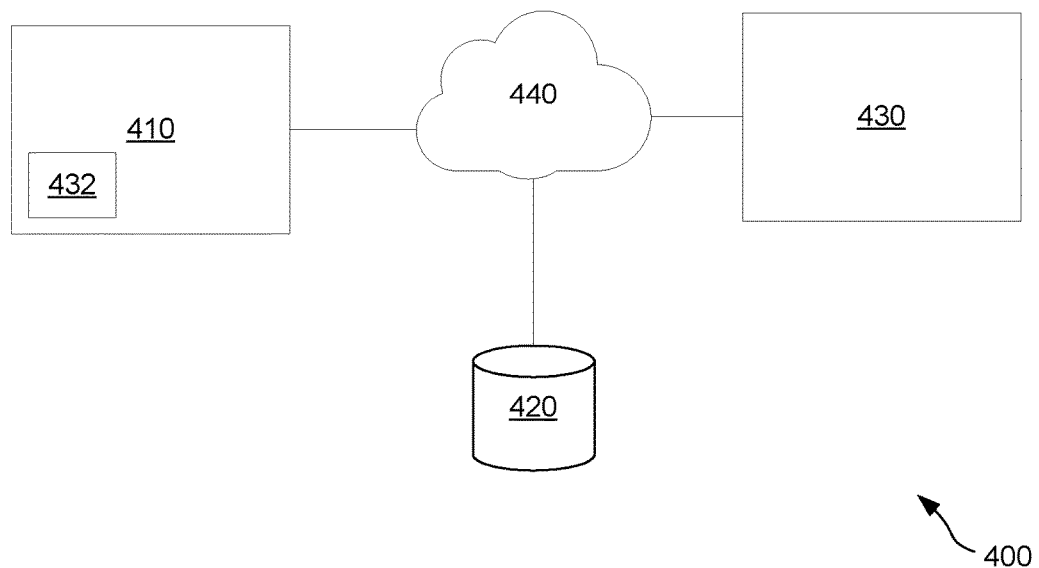
FIG. 4A depicts an example system configured to provide dynamic feedback to a network connected user, consistent with some embodiments of the disclosure.

FIG. 4A depicts an example system 400 configured to provide dynamic feedback to a network connected user, consistent with some embodiments of the disclosure. System 400 may include the following: a computing device 410 of the user (computer), a datastore 420, a DAVS 430, a user state monitor 432, and a network 440 communicatively coupling the other components of system 400. Computer 410 may be a desktop computer, laptop, a tablet, or other relevant computing device with input mechanisms (e.g., mouse, keyboard, touchscreen). FIG. 1 depicts an example computer system 100 that may be configured to perform as computer 410 in some embodiments.

DAVS 430 may be a computing device such as computer system 100. DAVS 430 may include one or more computing devices that are abstracted away from the user, such as the computing environment 50. The DAVS 430 may operate by monitoring the actions of the user and identifying a given state or current state of the user within a computing process. The computing process the user is trying to perform on computer 410 may include a plurality of one or more discrete tasks. The DAVS 430 may determine the state of the user by identifying actions for completing (or attempting to complete) the plurality of one or more discrete tasks. For example, DAVS 430 may identify the movement of a mouse cursor, input of a keyboard, status of on-screen elements, uniform resource identifiers or other relevant identification for identifying the actions of the user.

The identification of on-screen elements may leverage an image processor (not depicted). The image processor may be a collection of hardware and software, such as an application specific integrated circuit.

The image processor may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a movement or location of a cursor of computer 410 may be analyzed. In another example, a window related to a specific application or a browser tap related to a specific website may be obtained. Using a relevant object detection algorithm, the actions or operations of computer 410 by a user may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., windows, menus, dialogs, pop-overs, etc.) can be output as classifications determined by the supervised machine learning model.

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., two dialog box buttons), colors of objects, and/or other attributes of objects. In some embodiments, the output may generate a list including the identity and/or characteristics of objects (e.g., button state clicked, dialog box greyed out, etc.). In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of a user interface such that objects in the user interface may be recognized. In some embodiments, various objects, object attributes, and relationships between objects (e.g., hierarchical and direct relations) may be represented within a knowledge graph (KG) structure. Objects may be matched to other objects based on shared characteristics (e.g., parent and child windows of a similar or same application), relationships with other objects (e.g., a dialog box or modal window of a program), or objects belonging to the same class (e.g., two installation entries having a similar appearance).

The DAVS 430 may also determine the state and monitor the activity of the user based on identifying certain items that are already located on computer 410. The DAVS 430 may obtain the information on computer 410 from user state monitor 432. User state monitor 432 may be a process, job, daemon, utility, or other relevant computing entity running on computer 410 and analyzing the content of computer 410. User state monitor 432 may periodically communicate over network 440 to provide DAVS 430 with updates on the monitored activity. DAVS 430 may use the received updates to determine the state based on the activities identified by user state monitor 410.

The DAVS 430 may also determine the state and activity of the user by receiving text-based communication from the user. The DAVS 430 may perform natural language processing to identify key terms and phrases in the received communication from the user. The communication may be indicative of an information seeking behavior (e.g., the user asking for assistance in completing the process).

The DAVS 430 may compare the identification of on-screen elements of computer 410, the monitored activity located on computer 410, and the received communication, with historical data. The historical data may include previous communication with the user, previous successfully completed states of varying success in completing various processes on the computer 410, and other states of various success in completing processes on other computers (not depicted).

The DAVS 430 may use machine learning on the historical data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The DAVS 430 may use the result of comparing historical data to the information obtained from the user and obtained from computer 410 to determine what type of activity is being performed by the user and to compare the progress of the user in performing the discrete tasks of the process. The DAVS 430 may retrieve from datastore 420 one or more process flow graphs that represent processes that may be completed on computers (e.g., installation of drivers, updating of web browsers, configuring of word processing software, etc.). Datastore 420 may be a database, a server, or other relevant data structure for storage and retrieval of process flow graphs.

A process flow graph may be maps in forms of graphs. For example, the discrete tasks may be considered as process steps that are represented as vertices or nodes. A directed edge from one vertex A to another B may indicate in the graph that a given process can flow from A to B. Each node may include a plurality of elements, attributes, parameters, or other relevant values. Each of the plurality of elements on a given process step may be a context element (e.g., text box, button, etc. on a webpage; specific presence of a file; kernel configuration, etc.).

The process flow graph may be created before any analysis by the DAVS 430. A given process flow graph may be constructed, with respect to each possible goal that can be attained by a user of a computing system. During performance of the steps, a constructor of the process flow graph may pause or otherwise signify the completion of various states. At construction, each goal may be marked as a final state in a given graph (e.g., installation of a publishing software, updating a publishing software). The starting state of the process may be the starting vertex/node (state) of the graph. Each intermediate state (such as webpage, view, etc.) may be the intermediate vertices (states). Each element on each vertex (such as button, textbox, etc.) may be marked as a page-level context. The combination of element values in a given vertex may be a page-level context (e.g., both a dialog box is closed and a library file is present within a directory). The vertices may be connected by a directed edge from each earlier step to each possible later step in the process. For example, each edge is a conditional edge, made available for traversal in the graph only if a given set of values of the context elements, (that is, an overall page context) is satisfied.

The process flow graph may be a lightweight, low-size file, such as a text file or html file that includes the various state and configuration before or after each of the discrete tasks of performance on a process on a computer. A process flow graph may take up one thousandth, or one millionth of the size of a corresponding video that would demonstrate the steps that are represented in the process flow graph. A consumer-level storage device (e.g., a hard drive in computer 410) may be able to hold and access hundreds or thousands of process flow graphs that represent the various processes without utilizing a significant portion of the storage device.

The DAVS 430 may provide to the user a video or videos that are tailored to the process flow graph within the context of the current state of the user. For example, a user is trying to perform an installation of a development environment, and there are forty-five different discrete tasks, and correspondingly forty-five different states. The user has successfully completed the twenty-second discrete task but is struggling. The user may communicate with an automated assistant and the DAVS 430 may identify that the issue is the twenty-second vertex of a given process flow graph.

The DAVS 430 may render a video that illustrates operation of a computer at state twenty-two and ends at state twenty-three. The video may be rendered outside of computer 410 (e.g., on a cloud computing environment on the other side of network 440). The video may be rendered by the DAVS 430 creating an instance of an operating environment (e.g., an installed operating system with software similar to that installed on computer 410) (not depicted), by instructing a processor to manipulate the operating environment without human intervention. The operating environment may get to discrete task twenty-one by performing discrete tasks one—twenty. The performance of the discrete tasks may be based on a process flow graph. Then recording of an on-screen view of a desktop (a screen-recording) of the operating environment may be initiated. Next the DAVS 430 instructs the processor to perform steps twenty-two, then step twenty-three. Then the recording of the on-screen view may be stopped, and a video file may be the result. The video file may be quite small in size (e.g., an eight-megabyte thirty frames-per-second video having a six second duration).

The video may be provided with textual context to the user (e.g., "delete line 3 from autoexec.bat" and a corresponding video that depicts a mouse cursor navigating to the autoexec.bat file, opening it, highlighting line three, and deleting line three). The textual content may be provided by the DAVS 430 with the video in the form of an automated chatbot window. This may orient the user to successfully complete the process the user is trying to perform.

Figure 4B:
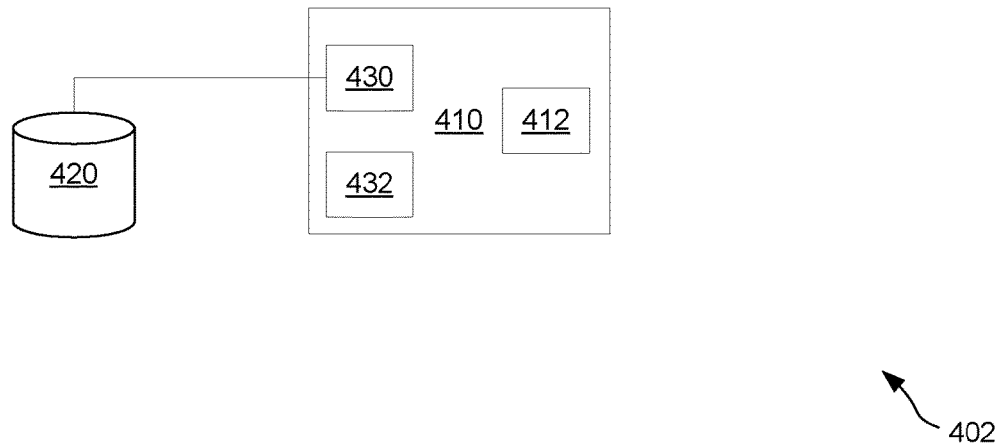
FIG. 4B depicts an example system configured to provide dynamic feedback locally to a user, consistent with some embodiments of the disclosure.

FIG. 4B depicts an example system 402 configured to provide dynamic feedback locally to a user, consistent with some embodiments of the disclosure. System 402 may include computer 410; datastore 420 containing one or more process flow graphs; and DAVS 430. DAVS 430 may operate along with user state monitor 432 in a similar configuration as that of system 400 other than there is no network in system 402.

DAVS 430 may include user state monitor 432 running under the software environment that a user is operating under similar to system 402. In some embodiments, DAVS 430 may operate in a second software environment on computer 410. For example, computer 410 may include a hypervisor 412 to partition the hardware of computer 410 into a plurality of software operating systems including a first operating system used by the user and a second operating system used by the DAVS 430.

Upon detecting that a user is performing a process, DAVS 430 may monitor progress of the first operating system. The DAVS 430 may receive progress from user state monitor 432. The user state monitor 432 may include images or video or textual values for analysis by the DAVS 430. Analysis, may include a determination that the user is performing an information seeking behavior or otherwise looking for assistance (e.g., by searching in a web browser with key terms.)

The DAVS 430 may request from hypervisor 412 a third partition. The DAVS 430 may recreate the environment of the first partition of computer 410 in the third partition. For example, the DAVS 430 may retrieve a background file (e.g., a desktop wallpaper image) from first partition and alter the background of the third partition. In another example, the DAVS 430 may set a default web browser of the third partition to the same web browser that the user is using in the first partition. The recreated environment may assist in conveying continuity to the user. For example, as the DAVS 430 creates videos for the user, the user interface may mimic the user interface that the user is used to and so the user may then more easily follow the video.

The DAVS 430 may perform the discrete tasks of the process flow graph up to but not including the current state of the user locally to provide a custom video for the user. For example, the process flow graph corresponding to the process that the user is attempting to perform represents the reconfiguration of a virtual private network (VPN) for achieving internet access at a workplace; the process flow graph contains eight discrete tasks (vertexes). The user is stuck at discrete task five. The DAVS 430 manipulates the operating system of the third partition to perform discrete tasks one—four and may generate a video from step four to step five. The video created by the DAVS 430 may be provided by giving read permissions to the video and providing a uniform resource location on computer 410 to the first partition.

After providing the video to the user, the DAVS 430 may delete the dynamically generated video. In some embodiments, DAVS 430 may request the hypervisor 412 to delete the third partition. This may be technically advantageous because the process flow graph may take up a small amount of space. A computer 410 may have only a small solid-state storage device that does not have a lot of space. Because, in some embodiments, there are no videos stored locally, computer 410 can provide video-based instruction and training based on the dynamic creation of short-length (e.g., seconds, only a few minutes) videos that may be only retained temporarily (e.g., until being viewed or otherwise accessed by the user).

In some embodiments, DAVS 430 may assist a user by including a user video that illustrates the non-completion or mistakes of the user. The user video may be a recording of movement of windows, cursors, and other elements as a result of input from a user, and processing by the first operating system (e.g., recorded locally on computer 410 by user state monitor 432). Upon detecting that a user is stuck at a given discrete task, DAVS 430 may stop recording of the first operating system. DAVS 430 may determine where the user is stuck what vertex of a process flow graph. The DAVS 430 may trim or discard portions of the user video corresponding to a previous vertex. For example, a user is stuck at discrete task fifteen of an installation and configuration process that includes twenty steps. The DAVS 430 may trim a user video to remove portions of the video that occur before a timestamp in the user video that corresponds to discrete task thirteen, leaving only a video of operation by the user from discrete task thirteen to failure of completion of discrete task fifteen.

Figure 5:
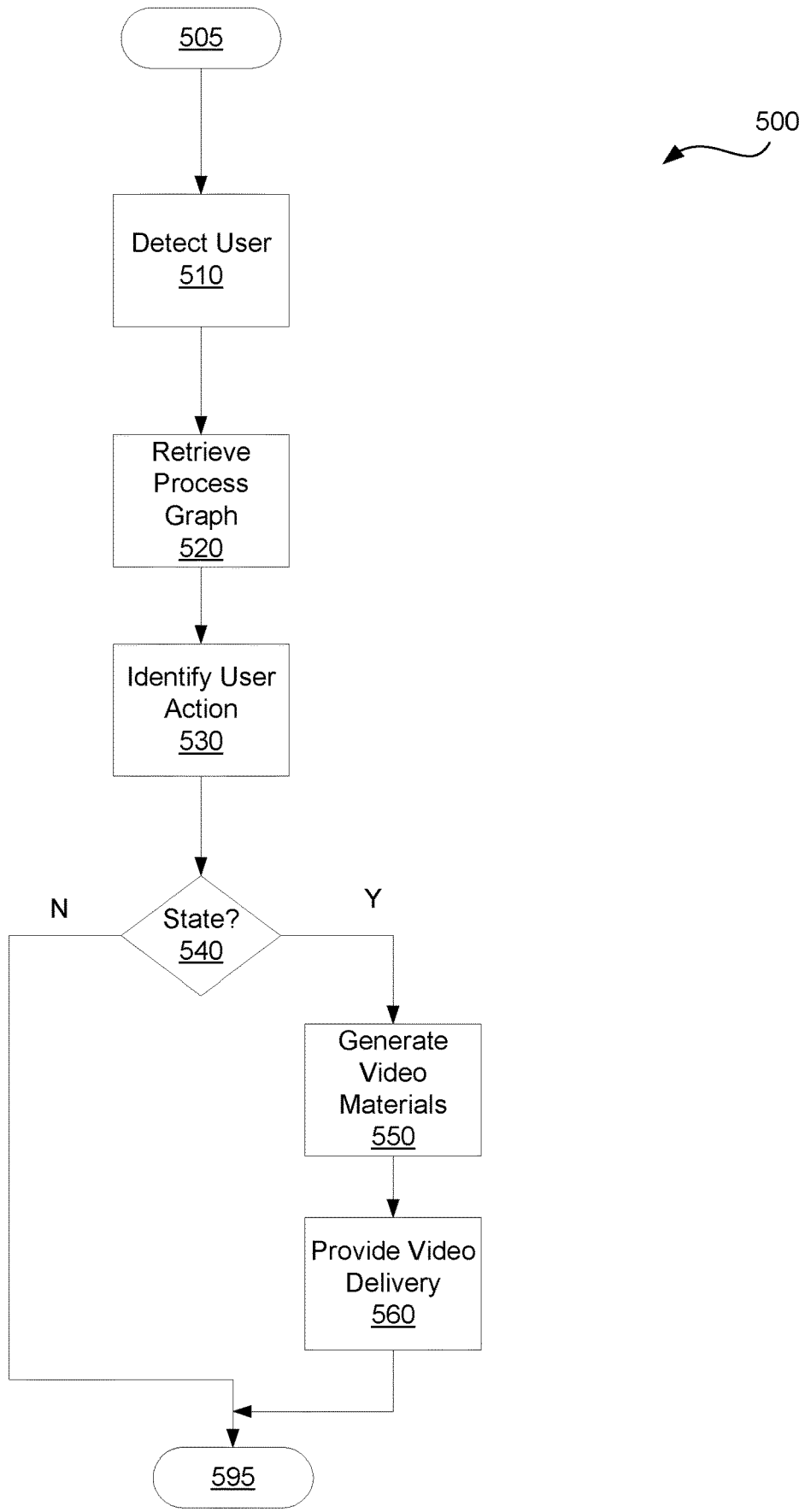
FIG. 5 depicts an example method for performing one or more operations of dynamic video generation, consistent with some embodiments of the disclosure.

FIG. 5 depicts an example method 500 for performing one or more operations of dynamic video generation, consistent with some embodiments of the disclosure. Method 500 may be performed by a computer system, such as computer system 100. Method 500 may be performed by one or more computing resources abstracted into a unified computing service, such as cloud computing environment 50. Method 500 may be performed by a system for dynamically generating assistance videos such as the DAVS 430 depicted in FIG. 4A and FIG. 4B.

Method 500 begins at 505, when the performance of a computing process is detected at 510. The detection of the user, at 510, may include detecting that the user is unsuccessful in performing a discrete task of the computing process. Detection of an unsuccessful attempt may include performing one or more image processing operations to determine the location of a pointer, cursor, or other visual input under control of the user. Detection of an unsuccessful attempt may include receiving a communication from the user. For example, a user may input text into a chat window of a chatbot that is part of a DAVS. The DAVS may perform natural language processing to identify that a user is requesting or needs help.

In some embodiments, detection of an unsuccessful attempt may include detection of repeated input of a user. For example, the input of a user may be sampled during operation of the computer. If a user performs certain discrete tasks, these tasks may have input fingerprints (e.g., moving to click a dialog box of an installing includes a specific cursor movement and a mouse click). If a user continues to perform the same discrete task over and over, the fingerprints may occur repeatedly. The repeated performance of the same discrete task may be determined to be an unsuccessful attempt. In some embodiments, detection of an unsuccessful attempt may include monitoring the input action of a user. For example, a user may be using a keyboard and typing certain words or phrases representative of an information seeking behavior into a web browser such as "help in installing", or "howto configure settings." Detection of an unsuccessful attempt may be based on identifying one or more keywords in the input of the keyboard that is indicative of the information seeking.

Detection of an unsuccessful attempt may include monitoring the input rate of the user. For example, the frequency or other input rate of a user may be monitored during a time period while the user is operating the computer. During the time period, the user may average a certain amount of actions per interval (e.g., mouse clicks per second, keyboard inputs per minute, cursor movements per minute). The certain amount of actions may establish a baseline threshold (e.g., seven mouse movements per minute, thirty keyboard inputs per minute). During operation, the detected operation of the user may fall below an average threshold. During operation, the detected operation may fall below by a certain predefined amount, such as a standard deviation. Falling below the threshold (e.g., by the certain predefined amount), may be a determination that the user is unsuccessful.

At 520, a process flow graph may be retrieved. The process flow graph may be related to the process that the user is attempting to perform. For example, if a user is attempting to perform an installation of an image editor program, all process flow graphs that include the image editor program may be retrieved. A relevant process flow graph may be selected by matching the completed one or more discrete tasks of the user with corresponding vertexes of all the retrieved process flow graphs. A given process flow graph may be selected if more vertexes match the completed discrete tasks than any of the other retrieved process flow graphs.

At 530 an action of the user may be identified. The identifying may be based on the retrieved process flow graph. Comparing to the process flow graph may include monitoring the entry point of the user in the process flow graph. To identify the path a user has taken through the graph, all the prior states of the user may be recorded. The states may correspond to nodes having context elements. For example, the presence of an installed application, the value of a kernel, the location of file within a specific directory, the updated date of a file, and the like. A current state within the process flow may also be identified. For example, the current state (e.g., webpage, past actions on the site) of the user may be identified by scanning the computer (e.g., scanning the memory of the computer of the user). The current state may be identified as a function of one or more of the following: a matching vertex within the graph based on the elements, parameters, or attributes of the vertex; a path on the graph traversed by the user to reach the current node; element values in each of the vertexes within the process flow graph; vertices (and the page context); chatbot assistance received by the user in prior instances of help being provided to the user as it relates to previous vertexes of the process flow graph; and actions that the user has successfully/at all taken after receiving assistance.

Identification of the user action may include one or more goal(s) based upon the possible goals reachable, via a process flow graph. For example, a given process flow graph may include a vertex with multiple options including a first option to configure settings for an application, and a second option to set up sharing preferences for the same application. Using graph traversal techniques, using all final states marked as potential goals in the process flow graph may be identified as potential states of the user. For each goal, each node lying on the path from the current point to the goal may be found. Next the attributes and values that correspond to actions that will take the user towards the next vertex on the process graph may be found. In some embodiments, the goals may be priorities for example, using a penalty/loss minimization or profit maximization type of heuristic. The goal may be identified such that the next discrete task to be performed gives overall the least penalty.

During identification, at 530, future potential goals for future assistance videos may be recorded. For example, at each step, the legitimacy of the transition from one vertex to another vertex along the process flow graph may be computed. The computation may be a function of the context element values that need to be entered at each vertex as the user process moves ahead. During computation, the values may be determined as legitimate or not legitimate, based on being able to be completed, already being completed, or another criterion. The legitimate values may be recorded in the system for appropriate delivery of the instructions. When the instructions are delivered in a subsequent stage of the process, these possible legitimate values may be used as part of the instructions for entering the context element values in a future assistance.

If a state of the process that is attempted to be performed is determined, at 540:Y, then an assistance video is dynamically generated at 550. The generation of the video may include what the user needs to do to attain the discrete task (steps and actions), where each action carried out at each discrete task takes the user to the next discrete task (the next vertex of the process flow graph). The generation of the video may include overlapping the transition map on the action view (visualization of the action such as a step of video etc.). The discrete task to be performed by the user may be computed as a shortest path from a deviation of the user. For example, a user may have deviated from the expected path to the discrete task (at some earlier discrete task). A shortest path may be computed from the current state of the user to each of the vertices on the process flow graph that are ahead of the last known good vertex. The chosen path that is shown as the video may be, the sum of (a) the path length from the current vertex to the vertex on the desirable path, and (b) the path length from that vertex (where the path from the current vertex meets the desirable path) to the goal vertex is minimized (e.g., the least number of steps).

Generation of the video at 550 may include performance of all the discrete tasks up to the deviation—by the user—before beginning of recording of performance of the next discrete task or tasks. For example, a process includes twenty-four discrete tasks for successful completion. Based upon detecting the user, it may be determined that steps one—eleven were already successfully completed. The discrete tasks one—eleven may be performed in an instruction computing instance. The instruction computing instance may be an environment configured solely for the generation of instructional videos (e.g., screen recordings that demonstrate cursor movement and keyboard input). The instruction computing instance may be created dynamically, such as an operating environment based on an image (e.g., a virtual machine, a container). The instruction computing instance may be configured in a similar manner as the computer of the user (e.g., a similar operating system, a similar set of installed applications). Before the performance of the twelfth task, a video recording may begin on the instruction computing instance. After the video is recording, the instruction computing instance may automatically perform the twelfth discrete task. After the twelfth discrete task is performed, the video recording may cease, and resultantly an instructional video may be created.

At 560 the generated video may be provided to the user. Providing the dynamically generated video to the user may include transmitting the video over a network. Providing the dynamically generated video to the user may include placing the video into a chat window of an automated assistant that is communicating with the user. Providing of the dynamically generated video may be formatted into a multi-media interface for the user. For example, text and images may be generated such that the text shows description/summary of the next discrete task. The text and images may enumerate the potential salient actions for the user to take (e.g., button clicks, text boxes and associated values to enter, the labels of radio buttons and the values to select). The text and images may describe or depict the potential result of the user successfully performing the discrete task (e.g., successful installation). A language model may be adopted by using given (pre-loaded) text instructions, and using natural language generation systems to ensure inclusion of those instructions. For example, sentence-based instructions along with the dynamically generated video states "Please, highlight the address bar and type in the proper website." After the video is generated at 560 (or if the current state is not determined 540:N), method 500 ends at 595. In some embodiments, method 500 may be performed continuously. For example, after the video is generated at 560 (or if the current state is not determined 540:N), method 500 may return to 505 to continue monitoring for performance of further discrete steps.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting a user performing a first process on a first computing device, wherein the first process includes one or more discrete tasks;
   retrieving, based on detection of the first process, a process flow graph related to the first process, the process flow graph having been generated before the performing of the first task;
   identifying, based on the first process and based on the process flow graph, a user action that relates to the one or more discrete tasks of the first process;
   determining, based on the process flow graph and based on identification of the user action, a current state of the first process; and
   generating, based on the current state of the first process and based on the user action, a first video that depicts one or more future actions that may be performed by the user to successfully perform the first process on the first computing device.

2. The method of claim 1, further comprising:
   detecting that the user is unsuccessful in performing the first process; and
   providing, based on detecting the user is unsuccessful, the first video to the user.

3. The method of claim 2, wherein the detecting the user is unsuccessful comprises:
   monitoring a first input rate of the first user at a first time period;
   monitoring a second input rate of the first user at a second time period; and
   determining the second input rate falls below a predefined threshold value.

4. The method of claim 2, wherein the detecting the user is unsuccessful comprises:
   receiving, by an automated assistant, a request from the user for help in performing the first process.

5. The method of claim 2, wherein detecting the user is unsuccessful comprises:
   monitoring a first input of the first user at a first time;
   monitoring a second input of the first user at a second time;
   comparing the first input to the second input; and
   determining the first input is the same as the second input.

6. The method of claim 2, wherein:
   the detection of the user performing the first process occurs at a first time period, and
   the detecting that the user is unsuccessful comprises:
      monitoring input actions of the first user on the first computing device during the first time period;
      detecting, based on the input actions, one or more keywords indicative of an information seeking behavior; and
      determining, based on the one or more keywords, the information seeking behavior is related to the performance of the first process.

7. The method of claim 1, further comprising:
   generating, based on the current state of the first process and based on the user action, a second video that depicts one or more prior actions that were performed by the user to achieve the current state.

8. The method of claim 7, further comprising:
   detecting the user is unsuccessful in the performing of the first process;
   providing, based on the detecting that the user is unsuccessful, the first video to the user; and
   providing, based on the detecting that the user is unsuccessful, the second video to the user.

9. The method of claim 1, wherein the identification of the user action comprises:
   scanning a memory of the first computing device; and
   detecting, based on the scanning, a first file that matches one or more parameters of the process flow graph.

10. The method of claim 1, wherein identification of the user action comprises:
    scanning an IO entity that is at least one of an input and an output of the first computing device; and
    detecting, based on the scanning of the IO entity, a first input received by the first computing device that matches one or more parameters of the process flow graph.

11. The method of claim 1, wherein identification of the user action comprises:
    scanning an IO entity that is at least one of an input and an output of the first computing device; and
    detecting, based on the scanning of the IO entity, a first output of the first computing device that matches one or more parameters of the process flow graph.

12. The method of claim 1, wherein the generation of the first video comprises:
    retrieving the process flow graph;
    generating an instruction computing instance, the instruction computing instance comprising one or more files indicated by the process flow graph and one or more configuration settings indicated by the process flow graph;
    performing, on the instruction computing instance, a subset of the one or more discrete tasks that occur before the current state;
    initiating a screen-recording of the instruction computing instance;
    performing a second subset of the one or more discrete tasks, the second subset related to successful performance of the first process from the current state; and
    transmitting the screen-recording to the first computing device.

13. The method of claim 12, wherein:
    the first process is performed on a first computing instance on the first computing device;
    the instruction computing instance is on a second computing device; and
    the transmitting of the screen-recording comprises:
       sending, through a network, the screen-recording to the first computing instance.

14. The method of claim 12, wherein:
    the first process is performed on a first computing instance on the first computing device;
    the instruction computing instance is a second computing instance performed on the first computing device; and
    the transmitting of the screen-recording comprises:
       providing, by the second computing instance and to the first computing instance, one or more access permissions to the screen-recording.

15. A system, the system comprising:
    a memory, the memory containing one or more instructions; and
    a processor, the processor communicatively coupled to the memory, the processor, in response to reading the one or more instructions, configured to:
       detect a user performing a first process on a first computing device, wherein the first process includes one or more discrete tasks;

retrieve, based on detection of the first process, a process flow graph related to the first process, the process flow graph generated before performance of the first task;

identify, based on the first process and based on the process flow graph, a user action that relates to the one or more discrete tasks of the first process;

determine, based on the process flow graph and based on identification of the user action, a current state of the first process;

generate, based on the current state of the first process and based on the user action, a first video that depicts one or more future actions that may be performed by the user to successful perform the first process on the first computing device.

16. The system of claim 15, the processor further configured to:

generate, based on the current state of the first process and based on the user action, a second video that depicts one or more prior actions that were performed by the user to achieve the current state.

17. The system of claim 15, wherein the processor is further configured to:

detect the user is unsuccessful in performing the first process;

provide, based on detecting the user is unsuccessful, the first video to the user; and provide, based on detecting the user is unsuccessful, the second video to the user.

18. A computer program product, the computer program product comprising:

one or more computer readable storage media; and program instructions collectively stored on the one or more computer readable storage media, the program instructions configured to:

detect a user performing a first process on a first computing device, wherein the first process includes one or more discrete tasks;

retrieve, based on detection of the first process, a process flow graph related to the first process, the process flow graph generated before performance of the first task;

identify, based on the first process and based on the process flow graph, a user action that relates to the one or more discrete tasks of the first process;

determine, based on the process flow graph and based on identification of the user action, a current state of the first process;

generate, based on the current state of the first process and based on the user action, a first video that depicts one or more future actions that may be performed by the user to successful perform the first process on the first computing device.

19. The computer program product of claim 18, wherein generation of the first video comprises:

retrieving the process flow graph;

generating an instruction computing instance, the instruction computing instance including one or more files indicated by the process flow graph and one or more configuration settings indicated by the process flow graph;

performing, on the instruction computing instance, a subset of the one or more discrete tasks that occur before the current state;

initiating a screen-recording of the instruction computing instance;

performing a second subset of the one or more discrete tasks, the second subset related to successful performance of the first process from the current state; and transmitting the screen-recording to the first computing device.

20. The computer program product of claim 19, wherein:

the first process is performed on a first computing instance on the first computing device, the instruction computing instance is a second computing instance performed on the first computing device; and transmitting the screen-recording comprises:

providing, by the second computing instance and to the first computing instance, one or more access permissions to the screen-recording.

* * * * *